Patented Aug. 1, 1950

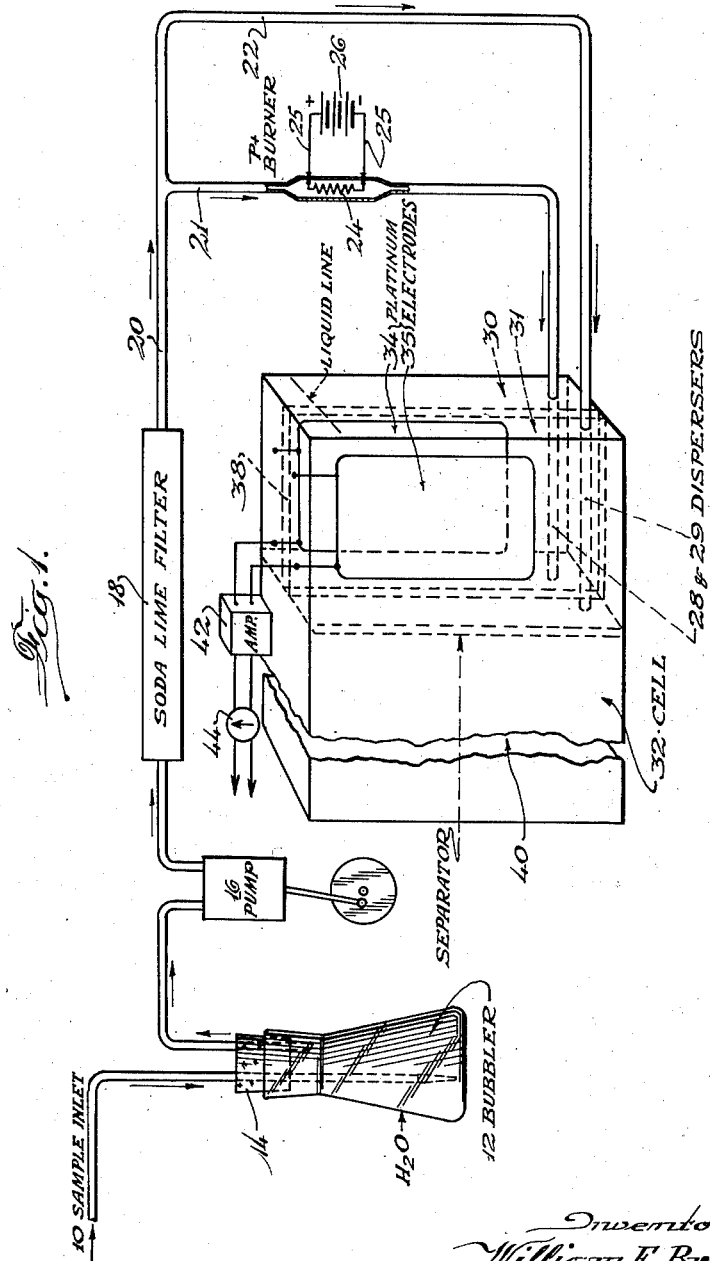

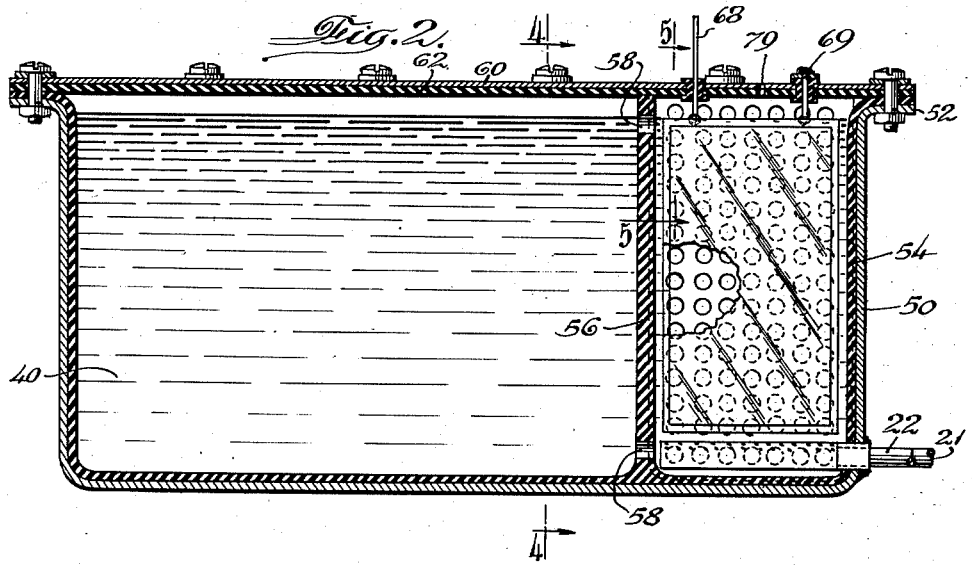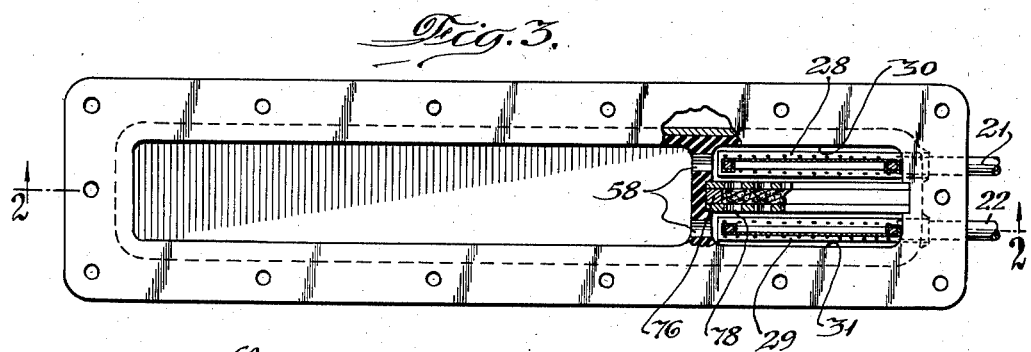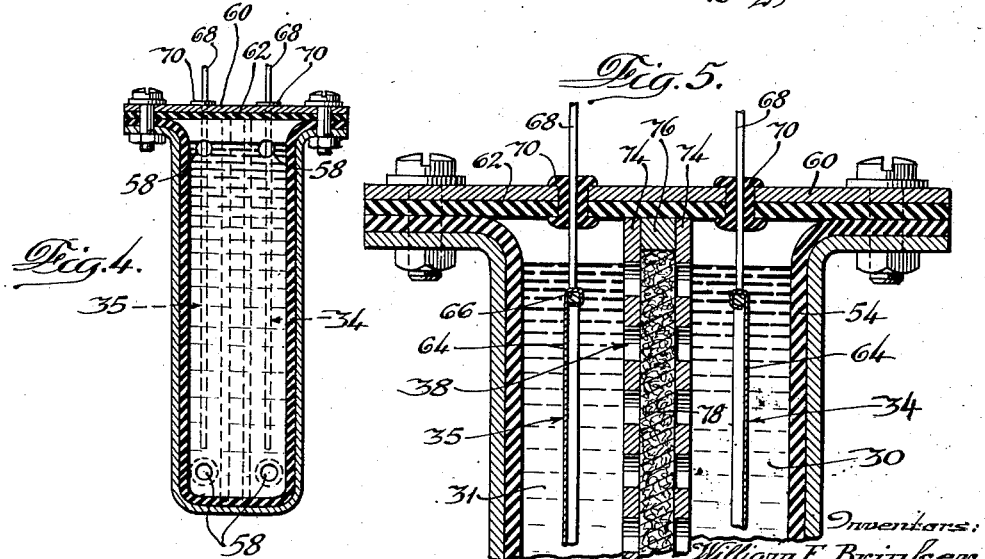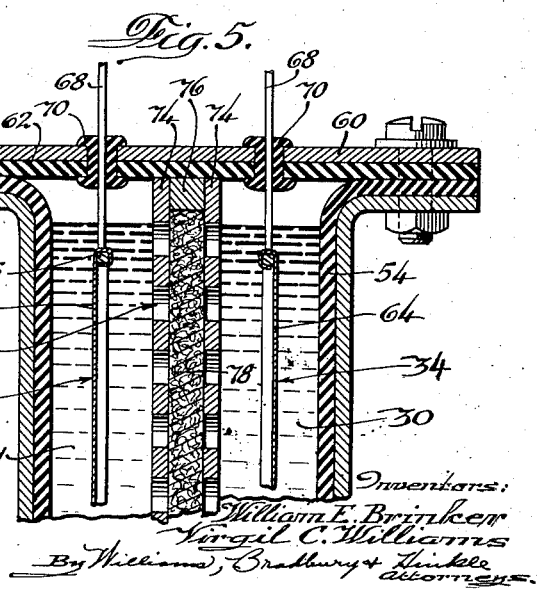

2,517,382

UNITED STATES PATENT OFFICE 2,517,382

METHOD FOR DETECTING ACID ANHYDRIDE-FORMING GASES SUCH AS CARBON MONOXIDE AND GASEOUS ACID ANHYDRIDES

William E. Brinker and Virgil C. Williams, Evanston, Ill.

Application January 10, 1945, Serial No. 572,212

6 Claims. (Cl. 23—232)

Our invention relates generally to an improved method and apparatus for the detection of gaseous acid anhydrides such as carbon dioxide and sulphur dioxide, particularly for the detection of small quantities of such gases and precursors thereof, such as carbon monoxide, in the atmosphere.

In many instances, particularly in the operation of aircraft, there is an ever present danger that carbon monoxide from the aircraft engines, auxiliary engines, or heating systems, may leak into the cabin. The fact that carbon monoxide is colorless and odorless renders it impossible for the crew to detect its presence, with the result that the members of the crew lose consciousness without having become aware of the fact that toxic percentages of carbon monoxide were present in the cabin.

It is therefore of greatest importance that the crew of an airplane have some means for detecting the presence of toxic quantities of CO in the cabin air. Many attempts have been made to provide such indicator, but in general have not proved entirely satisfactory because of the exacting requirements encountered in the use of such indicator upon an airplane. In the first place, the detecting apparatus must be very sensitive so as to detect minute percentages of CO in the air. Secondly, the apparatus must operate quickly so as to provide an indication or alarm of the presence of toxic percentages of CO before the crew is seriously affected. Thirdly, the apparatus must withstand vibration, should not be affected materially by large variations in pressure and temperature, should be light in weight, portable, and rugged, and should be self-regenerative.

It is thus an object of our invention to provide an improved method and apparatus for indicating the presence of very small quantities of carbon monoxide, acid anhydrides, and gases capable of forming acid anhydrides.

A further object is to provide an improved apparatus capable of giving an alarm when the percentage of CO in the air approaches values at which toxic effects may be expected.

A further object is to provide an improved simple portable cell for the detection of the presence of CO in air, utilizing a method based on the determination of the hydrogen ion concentration of water, or other suitable liquid, in which the air and $CO_2$, formed by the combustion of CO, is partially dissolved.

Other objects will appear from the following description, reference being had to the accompanying drawings, in which:

Fig. 1 is a flow diagram;

Fig. 2 is a longitudinal sectional view of the cell, taken on the line 2—2 of Fig. 3, with the cover in place;

Fig. 3 is a plan view of the cell, with the cover removed, portions of the cell being shown in fragmentary section;

Fig. 4 is a transverse sectional view taken on the line 4—4 of Fig. 2; and

Fig. 5 is a transverse sectional view, taken on the line 5—5 of Fig. 2, and drawn to an enlarged scale.

In general, the method of our invention is carried out as follows:

Air to be tested is drawn through a water bubbler by means of a pump, and forced through a filter containing soda lime, to remove all of the constituents except CO, oxygen, nitrogen, and possibly hydrogen. This continuously pumped sample of scrubbed air is then divided into two equal flow channels. In one of these channels there is located a platinum wire heated to incandescence, which operates as an igniter to cause combustion of any CO which may be present. Two flowing samples are forced into separate compartments of a cell containing water, or a salt solution, such as a potassium chloride or a sodium chloride solution, the compartments being separated by a pervious wall such as glass wool or similar porous or perforated medium, and are both connected to a reservoir compartment by small ports. The air flowing into these two compartments of the cell is admitted to the compartments at the bottom thereof through dispersers made of carbon, porous glass, or similar inert material, which is capable of dispersing the air in minute bubbles. Within each of the compartments there is an electrode, preferably made of platinum. When the hydrogen ion concentration in one compartment of the cell exceeds that in the other, a difference in potential will exist between the two electrodes. This potential difference may be amplified by means of a vacuum tube voltage amplifier, preferably incorporating a bridge circuit, the output of the amplifier being supplied to a suitable electrical meter which may be calibrated to indicate the percentage of CO present in the air being analyzed.

The output of the amplifier may also be utilized to operate a relay when the output voltage or current exceeds a predetermined value, the relay controlling the operation of any desired type of visible or audible signal, or the operation of ventilating or similar control means.

The apparatus utilized to carry out the method is diagrammatically illustrated in Fig. 1, and comprises an air inlet tube 10 which is connected to the space from which the air to be analyzed is drawn. The tube 10 projects through the stopper 14 to the bottom of a flask 12, the flask 12 containing water. In bubbling through this water, the air sample has removed from it any foreign particles and gases which are readily soluble in water, and the air is substantially saturated with water vapor. The air is withdrawn from the top of the flask 12 by a motor driven pump 16 and forced through a soda lime filter 18. This filter is effective to remove all of the usual constituents of the air except CO, oxygen, nitrogen, hydrogen, and the rare inert gases, argon, neon, xenon, and krypton. The scrubbed air from the filter 18 flows through a tube 20 which is divided into tubes 21 and 22 to provide similar parallel paths.

Within an enlargement of the tube 21 there is located a platinum wire 24 connected by sealed lead wires 25 to a source of electrical energy, illustrated as a battery 26. The voltage supplied to the platinum wire 24 is sufficient to maintain it at a temperature of incandescence. As a result, any CO in the air flowing through the tube 21, will be ignited, combining with the oxygen in the air to form carbon dioxide. Since the $CO_2$ in the original sample was removed from the air by the soda lime filter 18, the air flowing from the pipe 21 will contain a percentage of $CO_2$ directly proportional to the percentage of CO contained in the original sample. The tube 21 is connected to a disperser 28, while the tube 22 is connected to a similar disperser 29. The dispersers 28 and 29 are located near the bottom of compartments 30 and 31, respectively, of a cell 32.

Within the compartments 30 and 31 are suspended platinum electrodes 34 and 35, respectively. Platinum has been found to be one satisfactory metal for the electrodes, but reasonably satisfactory results may be obtained by the use of other conducting electrodes which are inert with respect to the liquids in which they are immersed, such, for example, as gold, carbon, antimony, tantalum, aluminum oxide, palladium, as well as other substances. The compartments 30 and 31 are separated by a porous partition 38, while the two compartments are connected by small ports with a reservoir chamber 40. The electrodes 34 and 35 are connected to the input terminals of an amplifier 42, the output of which is connected to a suitable electric meter 44 which is representative of any suitable indicating or relay device to be actuated by the output of the amplifier 42.

The particular construction of the cell 32 which has been found to be satisfactory, is more clearly shown in Figs. 2 to 5, inclusive, as comprising an oblong metal shell 50 having a flange 52 at its rim. The shell 50 is preferably lined throughout with a coating 54 of a synthetic rubber, such as Buna-N. The rubber lining is also conformed to provide a partition 56 provided with four ports 58. These ports connect the top and bottom of compartments 30 and 31, respectively, with the reservoir chamber 40. A metal cover 60 having a synthetic rubber lining 62, is bolted to the flange 52.

As best shown in Fig. 5, the electrodes 34 and 35 comprise sheets of platinum foil 64 supported by rectangular platinum wire frames 66. The electrodes have conducting wires 68 welded thereto. These wires, as well as support wires 69, extend through insulating grommets 70 mounted in the cover 60, 62.

As best shown in Figs. 3 and 5, the wall 38 between the compartments 30 and 31, is composed of a pair of perforated plates 74 and a hollow rectangular frame 76. The plates 74 and frame 76 may be made of a suitable plastic, such as polystyrene. The space enclosed by the frame 76 and between the perforated plates 74 is packed with fine glass wool 78. The partition 38 is held in place by fitting into suitable grooves formed in the synthetic rubber lining 54, as well as in the cross wall 56.

As best shown in Fig. 2, the diffusers or dispersers 28 and 29 are located respectively at the bottom of the compartments 30 and 31, and have the tubes 21 and 22 connected thereto respectively in any suitable manner, as by rubber tubing. The cell 40 is substantially filled with water, preferably containing a suitable salt. Dilute solutions of potassium chloride and sodium chloride have each been found satisfactory. Air may escape from a vent port 79. This port may be closed by suitable air escape valve which will block the escape of liquid from the cell.

In using the apparatus, the pump 16 is operated and the platinum burner 24 and amplifier 42 are electrically energized. As the air is bubbled through the water in the flask 12 and through the soda lime filter 18, most of the impurities are removed. CO being but slightly soluble in water, and not reacting with soda lime, passes through the burner and forms $CO_2$. The $CO_2$ bubbling through the water in compartment 30, decreases the pH value of the liquid in compartment 30. No comparable decrease occurs in the pH value of the liquid in compartment 31.

Since the compartments 30 and 31 are in electrical communication through the interstices in the glass wool partition 38, it is found that a measurable difference in potential will be present upon the electrodes 34 and 35 when a very small percentage of $CO_2$ is present in the air dispersed in the compartment 30. While this potential difference between the two electrodes is of the order of a fraction of a volt, it may be amplified so as to provide an accurate reading upon the meter 44, which may be calibrated to indicate the percentage of CO in the air sample being analyzed. This potential difference may be due to the contact potential at the interface or junction of the liquids in the two compartments 30 and 31.

The dispersion of the gases in the compartments 30 and 31 causes a certain amount of circulation of the liquid in these compartments, and there is also some circulation between these compartments and the reservoir chamber 40. As a result of this possibility of communication between the two compartments by way of the reservoir 40, as well as through the minute interstices in the glass wool partition, it is found that, probably due to ionic diffusion, the hydrogen ion concentration in the two compartments 34 and 35 will tend to be equalized within a relatively short time, in a matter of a few minutes, after there is no longer any CO in the gases being tested.

In normal use of the apparatus, the pump is operated continuously, so that the meter 44 will at all times indicate the percentage of CO in the air being analyzed, and any alarm device connected to the output of the amplifier 42 will be energized if at any time the percentage of CO approaches a predetermined value, for example, a concentration at which the air becomes toxic. The apparatus is self-regenerating, in that after a high concentration of CO in the air analyzed has been indicated by the meter, if the degree of concentration of CO in the air is decreased, the meter will indicate this fact with but a very short period of lag.

When the apparatus is to be utilized for the determination of the concentration of gases other than CO, the apparatus will be suitably modified so as to remove the acid anhydride from one of the two parallel flow paths leading respectively to the two compartments of the cell, while it is permitted to remain in the gas supplied to the other compartment. This can usually be accomplished by utilizing an appropriate filter or scrubber which will remove the gas for which the analysis is to be made from one-half of the sample, while the remainder of the sample is by-passed around such filter or scrubber. In this way the apparatus may be used for the detection or determination of the percentage concentration of any one of a plurality of different acid anhydrides.

By the method of analysis for CO described herein, it has been found that extremely minute percentages of CO in an atmosphere may be detected. A concentration in the order of ten parts of CO in a million parts of air may readily be measured. In fact, the method is such that the sensitivity increases with decreased concentration of the CO. This may be explained by the fact that the potential developed across the electrodes is determined by the logarithm of the ratio of the activity of the solution in one of the compartments relative to the activity of the solution in the other compartment.

The electrochemical formula may, for the sake of simplicity, be reduced to the following equation:

$$E = K \log \frac{a'}{a^0}$$

in which E is the potential difference generated across the electrodes; K is a constant; $a'$ is the activity of the solution in the compartment 30; and $a^0$ is the activity of the solution in the compartment 31. Since the temperature and pressure within these two compartments are equal, these factors, as well as others, need not be considered, or may be assumed to be included within the constant K. From this formula it will be apparent that as $a'$ increases in value, for example, from 0.001 (logarithm—3.00) to 0.010 (logarithm—2.00), the electrical potential difference across the electrodes will change by the factor 2/3. Because of this relationship it appears that under properly controlled conditions, the method of this invention may be employed to detect concentrations of CO in air of as low as one to ten parts in a billion. This is possible because the potentials developed are not proportional to the concentrations, but are proportional to the logarithm of the concentration, and therefore a relatively slight change in concentration causes a greatly magnified (mathematically and actually) change in the potential developed.

In addition to utilizing this method of CO detection and analysis in aircraft, it may be used for the detection of dangerous concentrations of CO in the atmosphere of garages, homes, various industrial plants where the presence of carbon monoxide, acid anhydrides, and precursors of acid anhydrides may be present in the atmosphere. With suitable variations in the apparatus, the method may also be employed for analysis of flue gases and similar gaseous mixtures, in which CO, other precursors of acid anhydrides, or acid anhydrides may be expected to be present and their concentration determined.

While we have shown and described a particular method and a particular apparatus for performing the method, it will be understood by those skilled in the art that the method may be varied, and variations in the apparatus may be made, without departing from the underlying principles of the invention. We therefore desire, by the following claims, to include within the scope of our invention all such equivalent methods and apparatus by which substantially the results of our invention may be obtained through the performance of substantially equivalent steps, or the use of substantially equivalent apparatus.

We claim:

1. The method of determining the presence of a small percentage of carbon monoxide in a gaseous mixture sample containing oxygen, which comprises, removing from the sample substantially all acid anhydrides, dividing the sample into two substantially equal parts, converting the carbon monoxide in only one of the parts of the sample into carbon dioxide, utilizing the oxygen in the sample, dispersing the two parts of the sample respectively in two portions of an aqueous solution separated by a solution pervious medium, and measuring the electrical potential difference between the two portions of the aqueous solution.

2. The method of determining the presence of a small percentage of carbon monoxide in an air mixture sample which comprises, removing from the sample substantially all acid anhydrides, dividing the sample into two substantially equal parts, converting the carbon monoxide in only one of the parts of the sample into carbon dioxide, dispersing the two parts of the sample respectively in two portions of an aqueous solution separated by a solution pervious wall, and measuring the difference in hydrogen ion concentration in the two portions of the solution.

3. The method of determining the presence of a gaseous acid anhydride in a sample of air which comprises, removing the gaseous acid anhydrides from one-half of the sample and dispersing this half of the sample through an aqueous solution in one of two compartments separated by a pervious partition, dispersing the other half of the sample containing the gaseous acid anhydride through the aqueous solution in the other compartment, and measuring the difference in electrical potential of the solutions in the compartments.

4. The method of determining the percentage of an acid anhydride forming gas in a gaseous mixture sample which comprises, removing from the gaseous mixture all acid anhydrides, dividing the sample into two substantially equal parts, converting the acid anhydride forming gas in one of the parts of the sample into its acid anhydride, dispersing the two parts of the sample respectively in two portions of an aqueous solution separated by a pervious medium, each portion containing an inert metallic electrode, and measuring the electrical potential difference between the two electrodes.

5. The method of determining the percentage of an acid anhydride forming gas in a gaseous mixture sample which comprises, removing from the sample substantially all acid anhydrides, dividing the sample into two substantially equal parts, converting the acid anhydride forming gas in one of the parts of the sample into its acid anhydride, dispersing the two parts of the sample respectively in two portions of an aqueous solution separated by a water pervious partition, and measuring the electrical potential difference between the two portions of the aqueous solution.

6. The method of detecting the presence of toxic percentages of carbon monoxide in air which comprises, continuously dispersing in an aqueous solution a sample of the air from which acid forming anhydrides have been removed, causing combination of carbon monoxide with oxygen in an equal portion of the sample to form carbon dioxide, dispersing the sample containing the carbon dioxide in an aqueous solution separated from the first mentioned aqueous solution by a porous partition, and measuring the electrical potential difference between the two aqueous solutions.

WILLIAM E. BRINKER.
VIRGIL C. WILLIAMS.

REFERENCES CITED

The following references are of record in the file of this patent:

UNITED STATES PATENTS

| Number    | Name         | Date          |
|-----------|--------------|---------------|
| 1,375,933 | Rideal et al.| Apr. 26, 1921 |
| 1,560,660 | Cain         | Nov. 10, 1925 |
| 1,893,490 | Beekley      | Jan. 10, 1933 |
| 1,900,884 | Lusby        | Mar. 7, 1933  |
| 1,944,803 | Ornstein     | Jan. 23, 1934 |
| 2,373,111 | Francis      | Apr. 10, 1948 |
| 2,400,923 | Farr         | May 28, 1948  |

FOREIGN PATENTS

| Number  | Country | Date          |
|---------|---------|---------------|
| 309,733 | Germany | Dec. 11, 1918 |